United States Patent

[11] 3,619,108

| [72] | Inventors | Richard Peter<br>Basel;<br>Hans-Joerg Angliker, Basel; Hans Wilhelm<br>Liechti, Oberwil, all of Switzerland |
|---|---|---|
| [21] | Appl. No. | 832,024 |
| [22] | Filed | June 10, 1969 |
| [45] | Patented | Nov. 9, 1971 |
| [73] | Assignee | Ciba Limited<br>Basel, Switzerland |
| [32] | Priority | June 11, 1968 |
| [33] | | Switzerland |
| [31] | | 8661/68 |

[54] POLYESTER FIBERS DYED WITH A WATER-INSOLUBLE AZO DYESTUFF
12 Claims, No Drawings

[52] U.S. Cl. ................................................ 8/41 C,
8/50, 8/41 A, 8/41 B, 8/41 R, 260/155, 260/156, 260/158
[51] Int. Cl. ........................................ C09b 31/14, D06p 1/02
[50] Field of Search ........................................ 8/41, 50; 260/156, 155, 158

[56] References Cited
UNITED STATES PATENTS

| 3,329,669 | 7/1967 | Sartori ........................ | 260/158 |
|---|---|---|---|
| 3,336,286 | 8/1967 | Sartori ........................ | 260/158 |

FOREIGN PATENTS

| 1,464,401 | 1/1966 | France ........................ | 260/156 |

Primary Examiner— George F. Lesmes
Assistant Examiner— Patricia C. Ives
Attorneys— Harry Goldsmith, Joseph G. Kolodny and Mario A. Monaco

ABSTRACT: Polyester fibers dyed with a water-insoluble azo dyestuff of the formula:

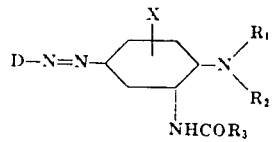

in which D represents the residue of a diazo component, $R_1$ and $R_2$ each represents an alkyl group that may be substituted and that may be interrupted by an oxygen atom, $R_3$ represents a six-membered heterocyclic residue and X represents a hydrogen atom or an alkyl, aryl, aryloxy, arylthio or alkyoxy group.

POLYESTER FIBERS DYED WITH A WATER-INSOLUBLE AZO DYESTUFF

This invention is based on the observation that valuable dyeings and prints may be obtained on hydrophobic fibrous material, for example, material made from cellulose esters, for example, secondary acetate and triacetate, polyamides, polyurethanes, polyacrylonitrile or polyvinyl chloride, and especially aromatic polyesters, for example polyethylene terephthalate, by using a water-insoluble azo dyestuff of the formula

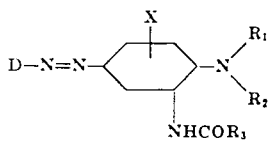

in which D represents the residue of a diazo component, $R_1$ and $R_2$ each represents an alkyl group that may be substituted, $R_3$ represents a six-membered heterocyclic residue and X represents a hydrogen atom or an alkyl, aryl, aryloxy, arylthio or alkoxy group.

The group $-COR_3$ represents advantageously the residue of a pyridinecarboxylic acid, for example pyridine-2-, -3- or -4- carboxylic acid or 2-chloro-3-nitro-5-pyridinecarboxylic acids:
quinoline-4-carboxylic acid,
quinoline-6-carboxylic acid, or
quinoline-8-carboxylic acid.

The residue represented by the symbol X may be, for example, a hydrogen atom or a methyl, ethyl, methoxy, ethoxy, phenylthio or phenoxy residue, and is preferably situated in meta-position to the azo group.

The groups, that is to say, groups containing 1 to 4, preferably 2 to 4, carbon atoms, for example methyl, ethyl, n-propyl or n-butyl groups, which may be substituted in the usual manner, for example, benzyl or β-phenylethyl groups, halogenated alkyl groups, for example, β-chloroethyl, β,β,β-trifluoroethyl and β, γ-dichloropropyl groups, β-cyanoethyl and alkoxyalkyl groups, for example, β-ethoxyethyl or butoxy butyl groups, hydroxyalkyl groups, for example, β-hydroxyethyl and β, γ-dihydroxypropyl groups, nitroalkyl groups, for example, β-nitro-ethyl groups, carbalkoxy groups, for example, β-carboxylic-(methoxy-, ethoxy- or propoxy)-ethyl groups (it being possible for the terminal alkyl group to carry a cyano, carbalkoxy, acyloxy or amino group in ω-position), β- or γ-carbo-(methoxy- or ethoxy)-propyl groups, acylaminoalkyl groups, for example, β-(acetyl-or formyl)-aminoethyl groups, acyloxyalkyl groups, for example, β-acetyloxyethyl and β,γ-diacetoxypropyl groups, β-propionyloxy ethyl-, β-butyryloxy ethyl-, methanesulphonylethyl, β-ethanesulphonylethyl and β-(para-chlorobenzenesulphonyl)-ethyl groups, alkyl- or arylcarbamoyloxy-alkyl groups, for example, β-methylcarbamyloxyethyl and β-phenylcarbamyloxyethyl groups, alkyloxycarbonyloxyalkyl groups, for example, β-(methoxy-, ethoxy- or isopropyloxy)-carbonylexy-ethyl groups, γ-acetamidopropyl groups, β-(para-nitrophenoxy)-ethyl groups, β-(para-hydroxyphenoxy)-ethyl groups, β-(β'-acetylethoxycarbonyl)-ethyl groups, β-[β'-(cyano-, hydroxy-, methoxy- or acetoxy)-ethoxycarbonyl]-ethyl groups, cyanoalkoxy-alkyl groups, β-carboxyethyl groups, β-acetylethyl groups, γ-aminopropyl groups, β-diethylaminoethyl groups, β-cyanoacetoxy-ethyl groups and β-benzoyl-β-(para-alkoxy- or phenoxy-benzoyl)-oxyethyl groups.

It is especially advantageous for $R_1$ and/or $R_2$ to represent β-cyanoethyl residues or esterified hydroxyethyl or hydroxypropyl residues.

The groups $R_1$ and $R_2$ generally contain not more than 18 carbon atoms.

The diazo residue D is derived principally from a monocyclic or bicyclic amine of the formula
$D-NH_2$, for example, any diazotizable heterocyclic amine that is free from acidic substituents imparting solubility in water, but especially, it is derived from an amine containing a heterocyclic five-membered ring having two or three hetero atoms, especially a nitrogen atom and one or two sulfur, oxygen or nitrogen atoms, and an aminobenzene containing a negative substituent, for example, an aminobenzene of the formula

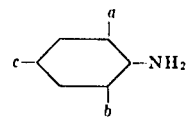

in which $a$ represents a hydrogen or a halogen atom or an alkyl or alkoxy, nitro, cyano, carbalkoxy or alkylsulphone group, $b$ represents a hydrogen or a halogen atom or an alkyl, cyano or trifluoromethyl group and $c$ represents a nitro, cyano, carbalkoxy or alkylsulphonyl group.

The following are given as examples: 2-aminothiazole, 2-amino-5-nitrothiazole, 2-amino-5-methylsulphonylthiazole, 2-amino-5-cyanothiazole, 2-amino-4-methyl-5-nitrothiazole, 2-amino-4-methylthiazole, 2-amino-4-phenylthiazole, 2-amino-4-(4'-chloro)-phenylthiazole, 2-amino-4-(4'-nitro)-phenylthiazole, 3-aminopyridine, 3-aminoquinoline, 3-aminopyrazole, 3-amino-1-phenylpyrazole, 3-aminoindazole, 3-amino-1,2,4-triazole, 5-(methyl-, ethyl-, phenyl- or benzyl)-1,2,4-triazole, 3-amino-1-(4'-methoxyphenyl)-pyrazole, 2-aminobenzthiazole, 2-amino-6-methylbenzthiazole, 2-amino-6-methoxybenzthiazole, 2-amino-6-chlorobenzthiazole, 2-amino-6-cyanobenzthiazole, 2-amino-6-thiocyanogenbenzthiazole, 2-amino-6-nitrobenzthiazole, 2-amino-6-carboethoxybenzthiazole, 2-amino-(4- or 6)-methylsulphonyl-benzthiazole, 2-amino-1,3,4-thiadiazole, 2-amino-1,3,5-thiadiazole, 2-amino-4-phenyl- or -4-methyl-1,3,5-thiadiazole, 2-amino-5-phenyl-1,3,4-thiadiazole, 2-amino-3-nitro-5-methyl-sulphonyl-thiophene, 2-amino-3,5-bis-(methylsulphonyl)-thiophene, 5-amino-3-methylisothiazole, 2-amino-4-cyanopyrazole, 2-(4'-nitrophenyl)-3-amino-4-cyanopyrazole, 3- or 4-aminophthalimide, aminobenzene, 1-amino-4-chlorobenzene, 1-amino-4-bromobenzene, 1-amino-4-methylbenzene, 1-amino-4-nitrobenzene, 1-amino-4-cyanobenzene, 1-amino-2,5-dicyanobenzene, 1-amino-4-methyl-sulphonylbenzene, 1-amino-4-carbalkoxybenzene, 1-amino-2,4-dichlorobenzene, 1-amino-2,4-dibromobenzene, 1-amino-2-methyl-4-chlorobenzene, 1-amino-2-trifluoromethyl-4-chlorobenzene, 1-amino-2-cyano-4-chlorobenzene, 1-amino-2-carbomethoxy-4-chlorobenzene, 1-amino-2-carbomethoxy-4-nitrobenzene, 1-amino-2-chloro-4-cyanobenzene, 1-amino-2-chloro-4-nitrobenzene, 1-amino-2-bromo-4-nitrobenzene, 1-amino-2-chloro-4-carbethoxybenzene, 1-amino-2-chloro-4-methylsulphonylbenzene, 1-amino-2-methylsulphonyl-4-chlorobenzene, 1-amino-2-methylsulphonyl-4-nitrobenzene, 1-amino-2,4-dinitrobenzene, 1-amino-2,4-dicyanobenzene, 1-amino-2-cyano-4-methylsulphonylbenzene, 1-amino-2,6-dichloro-4-cyanobenzene, 1-amino-2,6-dichloro-4-nitrobenzene, 1-amino-2,4-dicyano-6-chlorobenzene, para-amino-ortho-nitroazobenzene, 4-aminobenzoic acid cyclohexyl-ester, para-aminoazobenzene, 1-amino-2,4-dinitro-6-chloro-benzene and especially 1-amino-2-cyano-4-nitrobenzene; also 1-aminobenzene-2-, -3- or -4-sulfonic acid amides, for example, N-methyl- or N,N-dimethyl- or -diethylamide.

The dyestuffs to be used in accordance with the invention preferably correspond to the formula

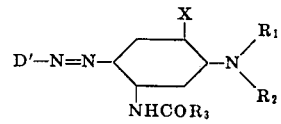

in which D' represents a negatively substituted benzene residue, X represents a hydrogen atom or a methyl or methoxy group, $R_1$ and $R_2$ each represents an alkyl group that may be substituted for example by a hydroxyl, alkoxy, cyanoalkoxy, acyloxy or cyano group, and $R_3$ has the meaning given above, but is preferably a pyridine residue.

Dyestuffs of the kind defined in the foregoing are described in French Pat. No. 1,464,401.

Dyestuffs of the kind used in accordance with the invention may be obtained by reacting a 3-amino-N,N-dialkylaniline with pyridine-2-, -3- or -4-carboxylic acid chloride, 2-chloro-3-nitro-5-pyridinecarboxylic acid chloride or quinoline-4-, -6- or -8-carboxylic acid chloride. The following are given as examples of suitable 3-amino-N,N-dialkylanilines: 3-amino-N,N-diethylaniline, 3-amino-N,N-bis-($\beta$-cyanoethyl)-aniline and 3-amino-N,N-bis-($\beta$-acetoxyethyl)-aniline.

These anilines may be obtained by hydrogenation of the nitro group of an analogous 3-nitroaniline.

In some cases it may be advantageous to use a mixture of two or more of the dyestuffs to be used in accordance with the invention.

For dyeing, the dyestuffs are advantageously used in a finely divided form, and dyeing is carried out in the presence of a dispersing agent, for example, sulphite cellulose waste liquor or a synthetic detergent, or a combination of different wetting and dispersing agents. Prior to dyeing, it is generally advantageous to convert the dyestuff into a dyeing preparation which contains a dispersing agent and the dyestuff in a form such that a fine dispersion is obtained when the preparation is diluted with water. Such dyestuff preparations may be obtained by a method known per se, for example, by grinding the dyestuff in the dry or wet state in the presence or absence of a dispersing agent.

To obtain stronger dyeings on polyethylene terephthalate fibers it is generally advantageous to add a swelling agent to the dyebath, or more especially to carry out the dyeing process under superatmospheric pressure at a temperature of greater than 100° C., for example at 120° C. Suitable swelling agents are aromatic carboxylic acids, for example, benzoic acid and salicylic acid; phenols, for example, ortho- or para-hydroxydiphenyl; aromatic halogen compounds, for example, chlorobenzene, ortho-dichlorobenzene and trichlorobenzene; and phenylmethylcarbinol or diphenyl. When carrying out the dyeing process under superatmospheric pressure it is generally advantageous to render the dyebath slightly acidic, for example, by the addition of a weak acid, for example, acetic acid.

The dyestuffs to be used in accordance with the invention are specially suitable for application by the so-called thermofixation process in which the material to be dyed is impregnated at a temperature not exceeding 60° C. with an aqueous dispersion of the dyestuff which advantageously contains within the range of from 1 to 50 percent of urea and a thickening agent, especially sodium alginate, and then squeezed in the usual manner. The impregnated material is advantageously squeezed so as to retain 50 to 100 percent of its dry weight of dye-liquor.

To fix the dyestuff, the material so impregnated is heated to a temperature above 100° C., for example, to a temperature within the range of from 180° to 220° C., advantageously after drying, for example, in a current of warm air.

The aforementioned thermofixation process is specially suitable for the dyeing of union fabrics made from polyester fibers and cellulosic fibers, especially cotton. In this case, in addition to the dyestuff to be used in accordance with the invention, the padding liquor contains dyestuffs suitable for dyeing cotton, for example, direct dyestuffs or vat dyestuffs, or especially reactive dyestuffs, that is to say dyestuffs capable of being fixed on the cellulosic fiber with formation of a chemical bond, for example, dyestuffs which contain a chlorotriazine or chlorodiazine residue. In the latter case, it is generally advantageous to add an agent capable of binding acid to the padding liquor, for example an alkali metal carbonate, an alkali metal phosphate, an alkali metal borate or an alkali metal perborate, or mixtures thereof. When using vat dyestuffs, the padded fabric must be treated after the heat treatment with an aqueous alkaline solution of one of the reducing agents commonly used in vat dyeing.

The dyeings obtained on polyester fibers in accordance with the process of the invention are advantageously subjected to an after-treatment, for example, by heating with an aqueous solution of a nonionic detergent.

The process of the invention is also suitable for dyeing union fabrics made from polyester fibers and wool; the wool portion is reserved and can subsequently be dyed with a wool dyestuff.

The dyestuffs to be used in accordance with the process of the invention may also be applied by printing processes. In this method of application a printing paste is used which contains, for example, in addition to the usual printing adjuvants, for example thickening and wetting agents, the finely divided dyestuff, if necessary, in admixture with one of the above-mentioned cotton dyestuffs, if necessary, together with urea and/or an agent capable of binding acid.

The process of the invention yields strong dyeings and prints possessing excellent properties of fastness, especially good fastness to light, sublimation, decatizing, washing and chlorinated water. Dyeings produced on cellulose acetate materials are distinguished by good fastness to burnt gas fumes. A further advantage lies in the fact that the dyestuffs to be used in accordance with the invention reserve well on wool and cotton.

The following examples illustrate the invention, the parts and percentages being by weight, unless otherwise stated.

EXAMPLE 1

0.5 part of the dyestuff of the formula

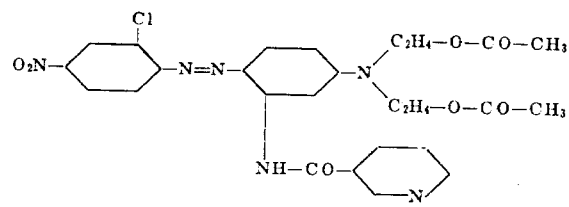

and 0.5 part of 2,2'-dinaphthylmethane disulphonic acid are ground to a fine dispersion. The dispersion is added to a dyebath containing 3 parts of glacial acetic acid and 3 parts of N-benzyl-$\mu$-heptadecylbenzimidazole disulphonic acid in 3,000 parts of water. 100 parts of well wetted cellulose acetate rayon are entered at 40° C., the temperature is raised to 80° C. and dyeing is carried out for 1 hour at 80° C. The cellulose acetate rayon is dyed bluish red and the dyeing possesses good fastness to light and sublimation.

The dyestuff may be obtained as follows:

1.73 parts of 2-chloro-4-nitroaniline are diazotized in the usual manner and the diazo solution is added dropwise at a temperature not exceeding 10° C. to a solution of 3.85 parts of N-bis-$\beta$-acetoxyethyl-3-nicotinylaminoaniline in 100 parts by volume of acetone. The batch is neutralized by the addition of a sodium acetate solution and when coupling is finished the dyestuff is precipitated by the addition of water. The dyestuff is then isolated by filtration and dried.

EXAMPLE 2

1 part of the dyestuff used in example 1 pasted with a fatty alcohol/ethylene oxide condensation product is diluted with 4,000 parts of water, and then 1.6 parts of glacial acetic acid and 1 part of a fatty alcohol/ethylene oxide condensation product are added. 100 parts of a cellulose triacetate fabric are entered into the dyebath so prepared at 30° C., the bath is heated to the boil and dyeing is carried out for 1 hour at the boil. A bluish red dyeing possessing good fastness to light and sublimation is obtained.

EXAMPLE 3

1 part of the dyestuff used in example 1 is ground wet with 2 parts of a 50 percent aqueous solution of the sodium salt of 1,1'-dinaphthylmethane-2,2'-disulphonic acid and the batch is then dried.

The dyestuff preparation so obtained is mixed with 40 parts of a 10 percent aqueous solution of the sodium salt of N-benzyl-μ-heptadecylbenzimidazole disulphonic acid and then 4 parts of a 40 percent acetic acid solution are added. A dyebath of 4,000 parts is prepared therefrom by dilution with water.

100 parts of a cleaned polyester fiber fabric are entered into the dyebath at 50° C., the temperature is raised to within the range of from 120° to 130° C. within 30 minutes and dyeing is carried out in a closed vessel for 1 hour at that temperature. The material is then well rinsed. A bluish red dyeing possessing excellent fastness to light and sublimation is obtained.

Dyestuffs that dye polyester fibers the shades listed in column III of the following table may be obtained by coupling the diazo components listed in column I with the coupling components shown in column II.

| | I | II | III |
|---|---|---|---|
| 1 | $O_2N-\text{C}_6H_3(CN)-NH_2$ | cyclohexyl-N$(C_2H_4-O-CO-CH_3)_2$, NH-CO-pyridyl | Violet. |
| 2 | $O_2N-\text{C}_6H_4-NH_2$ | Same as above | Scarlet. |
| 3 | $O_2N-\text{C}_6H_3(Cl)-NH_2$ | cyclohexyl-N$(C_2H_4-CN)_2$, NH-CO-pyridyl | Red. |
| 4 | $O_2N-\text{C}_6H_4-NH_2$ | cyclohexyl-N$(C_2H_4-CN)_2$, NH-CO-pyridyl | Orange. |
| 5 | $O_2N-\text{C}_6H_3(CN)-NH_2$ | cyclohexyl-N$(C_2H_4-CN)_2$, NH-CO-pyridyl | Bluish red. |
| 6 | $O_2N-\text{C}_6H_3(CN)-NH_2$ | cyclohexyl-N$(C_2H_4-O-CO-CH_3)_2$, NH-CO-pyridyl | Violet. |
| 7 | $C_2H_5O$-benzothiazol-2-yl-$NH_2$ | cyclohexyl-N$(C_2H_4-CN)_2$, NH-CO-pyridyl | Red. |
| 8 | $O_2N-\text{C}_6H_4-NH_2$ | cyclohexyl-N$(C_2H_5)_2$, NH-CO-pyridyl | Red. |
| 9 | $O_2N-\text{C}_6H_3(Cl)-NH_2$ | cyclohexyl-N$(C_2H_4-OCH_3)_2$, NH-CO-pyridyl | Ruby. |

| I | II | III |
|---|---|---|
| 10 | 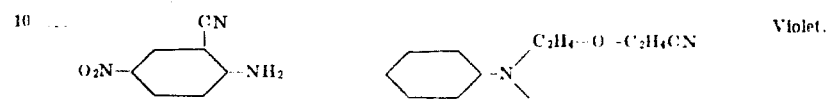 | Violet. |
| 11 | 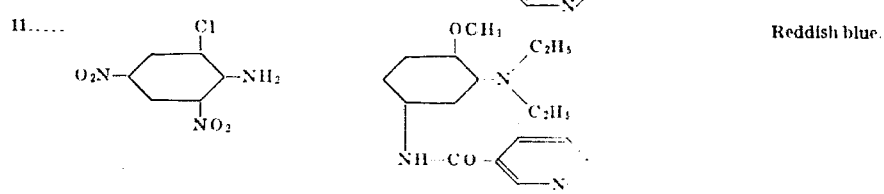 | Reddish blue. |
| 12 | 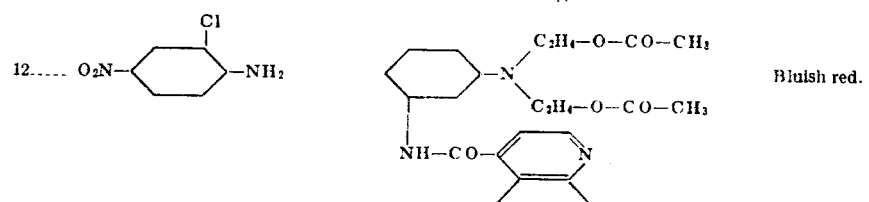 | Bluish red. |
| 13 | 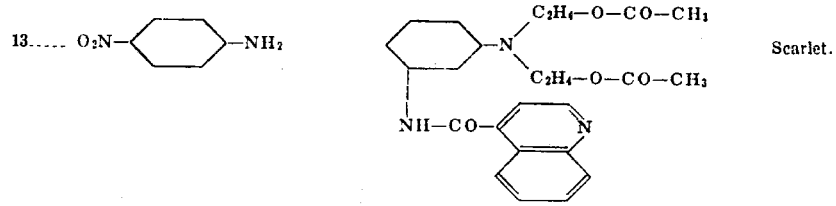 | Scarlet. |
| 14 | 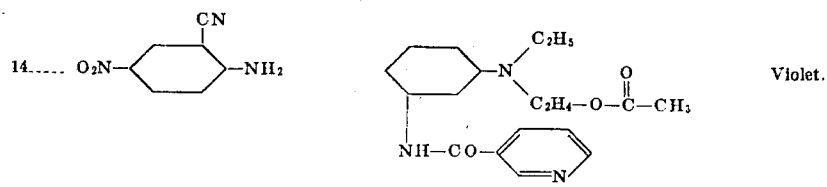 | Violet. |
| 15 | 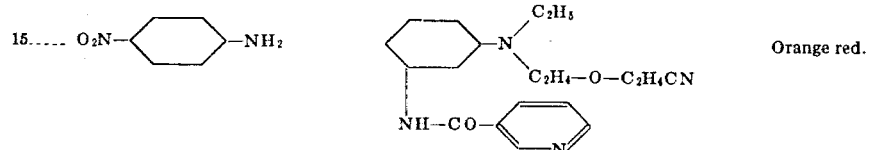 | Orange red. |
| 16 | 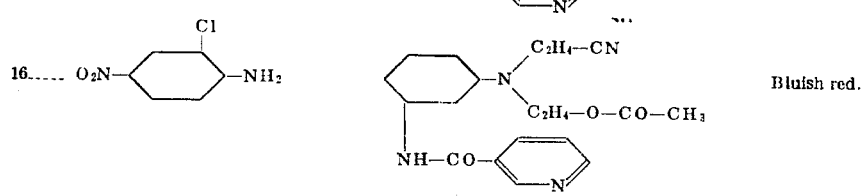 | Bluish red. |
| 17 | 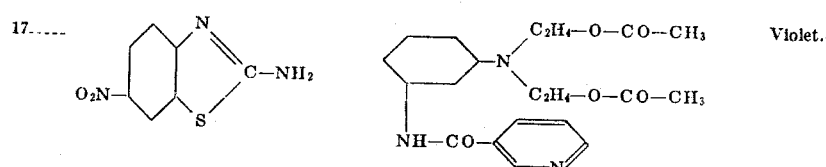 | Violet. |
| 18 | 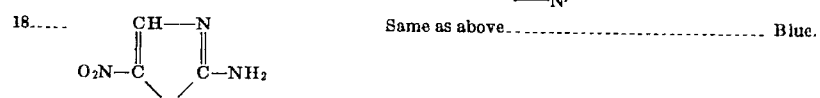 Same as above | Blue. |
| 19 | 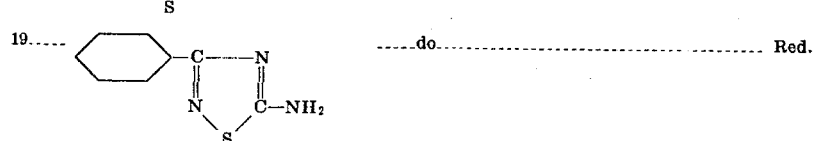 do | Red. |

| I | II | III |
|---|---|---|
| 20 ... ![structure: O2N-phenyl(CF3)-NH2] | ![structure: phenyl-N(C2H4CN)(C2H4-O-CO-CH3), NH-CO-pyridyl] | Violet. |
| 21 ..... ![structure: O2N-phenyl(Br)(NO2)-NH2] | ![structure: phenyl-N(C2H5)(C2H4-O-CO-CH3), NH-CO-pyridyl] | Reddish-blue. |
| 22 ..... ![structure: phenyl-C=N, N-S-C-NH2 (thiadiazole)] | ![structure: phenyl-N(CH3)(C2H4CN), NH-CO-pyridyl] | Red. |

EXAMPLE 4

20 parts of the dyestuff used in example 1 are ground together with 140 parts of water containing 40 parts of sodium dinaphthylmethane disulphonate.

A padding liquor is prepared using 200 parts of the above-mentioned dyestuff preparation, 100 parts of carboxymethyl cellulose (4 percent aqueous solution) and 700 parts of water. The liquor is prepared by stirring the dyestuff preparation into the diluted thickening by means of a high-speed stirrer and then adjusting the pH of the mixture to 6 by the addition of 80 percent acetic acid. A fabric made from polyester fibers is padded through this liquor at 30° C. to give a weight-increase of 60 percent and is then dried at 70° to 80° C. The fabric is then heated for 60 seconds at 210° C. on a stenter, washed hot, and then given a good rinse in cold water. A bluish red dyeing is obtained.

EXAMPLE 5

1 part of the dyestuff preparation used in example 1 is mixed with 100 parts of a 10 percent aqueous solution of a condensation product obtained from octadecyl alcohol and 20 mols of ethylene oxide, and then a dyebath of 4,000 parts is prepared therefrom by dilution with water.

100 parts of a polyamide fabric are entered into the cold dyebath, the temperature is raised to 90° C. within 30 minutes, and dyeing is carried out for 1 hour at that temperature. A bluish red dyeing possessing good fastness to light and washing is obtained.

EXAMPLE 6

2 parts of the dyestuff used in example 1 are dissolved in 3,000 parts of water in the presence of 1 part of sodium acetate crystals, 5 parts of calcined sodium sulfate, and acetic acid to produce a pH of 4.5 to 5. 100 parts of polyacrylonitrile filament yarn are entered into the dyebath so prepared at 80° C., the temperature is raised to a maximum of 120° C. within 45 minutes, and dyeing is carried out for 30 minutes at 120° C. The bath is then cooled slowly and the material is rinsed. A strong, bluish red dyeing possessing excellent fastness to sublimation is obtained.

We claim:

1. Aromatic polyester dyed with a water insoluble azo dyestuff of the formula

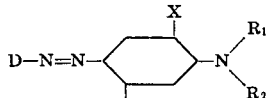

in which D represents an aromatic or heterocyclic radical in the diazo component used to form the azo dye, $R_1$ and $R_2$ each represents an alkyl group containing up to 4 carbon atoms that may be substituted by hydrocarbyl-carbonyloxy containing up to 7 carbon atoms, cyano, $C_1$-$C_4$-alkoxy, hydroxy or phenyl and that may be interrupted by an oxygen atom, $R_3$ represents a pyridine or quinoline residue and X is hydrogen, $C_1$-$C_2$-alkyl, phenyl, phenoxy, or $C_1$-$C_2$-alkoxy.

2. Polyester fibers claimed in claim 1, which are dyed with a dyestuff in which D is a substituted phenyl residue or a heterocyclic residue and X is a hydrogen atom or a methyl, ethyl, phenyl, phenoxy, ethoxy or methoxy residue.

3. Polyester fibers as claimed in claim 2, which are dyed with a dyestuff in which D is a negatively substituted phenyl residue.

4. Polyester fibers as claimed in claim 2, which are dyed with a dyestuff in which X is a hydrogen atom, a methyl group of a methoxy group.

5. Polyester fibers as claimed in claim 2, which are dyed with a dyestuff in which $R_3$ is a pyridine residue.

6. Polyester fibers as claimed in claim 5, which are dyed with a dyestuff in which $R_3$ is a quinoline residue.

7. Polyester fibers as claimed in claim 2, which are dyed with a dyestuff, wherein $R_1$ and $R_2$ each represents an alkyl group which contains two to four carbon atoms and may carry a cyano, hydrocarbyl carbalkoxy, hydroxy or alkoxy group.

8. Polyester fibers which are dyed with a dyestuff of the formula

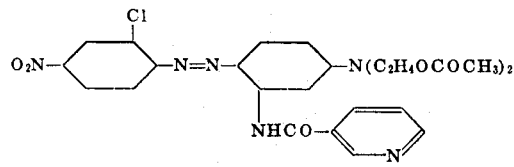

9. Polyester fibers which are dyed with a dyestuff of the formula

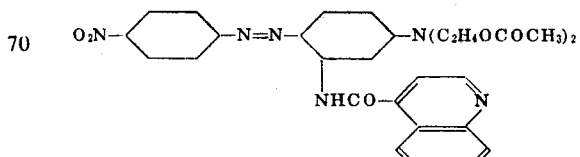

10. Polyester fibers which are dyed with a dyestuff of the formula
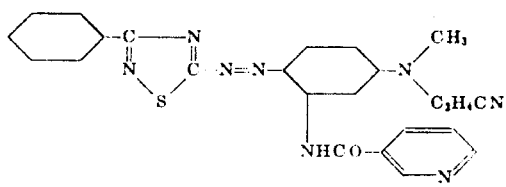
11. Polyester fibers which are dyed with a dyestuff of the formula
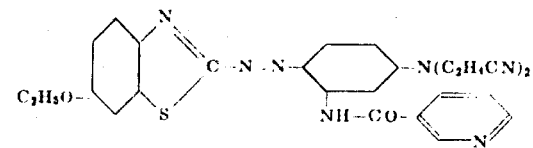
12. Polyester fibers which are dyed with a dyestuff of the formula
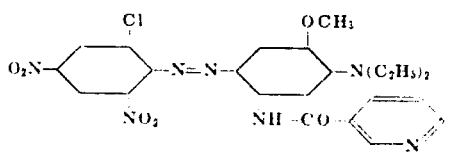
* * * * *